(12) United States Patent
Okita

(10) Patent No.: US 9,164,356 B2
(45) Date of Patent: Oct. 20, 2015

(54) LIGHT ADJUSTING APPARATUS

(71) Applicant: OLYMPUS CORPORATION, Tokyo (JP)

(72) Inventor: Tatsuhiko Okita, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/669,037

(22) Filed: Mar. 26, 2015

(65) Prior Publication Data

US 2015/0198861 A1   Jul. 16, 2015

Related U.S. Application Data

(63) Continuation of application No. PCT/JP2013/063634, filed on May 16, 2013.

(30) Foreign Application Priority Data

Sep. 28, 2012   (JP) ................ 2012-217037

(51) Int. Cl.
  *G03B 9/02*    (2006.01)
  *G03B 11/00*   (2006.01)
  *G03B 13/34*   (2006.01)

(52) U.S. Cl.
  CPC . *G03B 9/02* (2013.01); *G03B 11/00* (2013.01); *G03B 13/34* (2013.01); *G03B 2205/0046* (2013.01)

(58) Field of Classification Search
  CPC .......... G03B 9/02; G03B 11/00; G03B 13/34; G03B 13/36; G03B 2205/0046
  See application file for complete search history.

(56) References Cited

U.S. PATENT DOCUMENTS

| 4,544,249 | A | * | 10/1985 | Maemori et al. | ................ 396/73 |
| 4,725,864 | A | * | 2/1988 | Ogawa et al. | ................... 396/73 |
| 5,070,407 | A | * | 12/1991 | Wheeler et al. | ............... 348/342 |
| 2011/0292484 | A1 | * | 12/2011 | Ide | ................................ 359/230 |

(Continued)

FOREIGN PATENT DOCUMENTS

| JP | 10-020360 A | 1/1998 |
| JP | 2004-064899 A | 2/2004 |
| JP | 2004-205967 A | 7/2004 |
| JP | 2012-014092 A | 1/2012 |

(Continued)

OTHER PUBLICATIONS

International Search Report dated Aug. 27, 2013 issued in PCT/JP2013/063634.

*Primary Examiner* — W B Perkey
(74) *Attorney, Agent, or Firm* — Scully, Scott, Murphy & Presser, PC

(57) ABSTRACT

A light adjusting apparatus including first and second substrates that include openings and are disposed parallel to each other at a predetermined distance, a rotating shaft member rotatably attached to the first and second substrates, a drive section that rotates the rotating shaft member, an incident light adjusting section that has a light adjusting function and is joined to the rotating shaft member so as to rotate integrally therewith, and a ring-shaped protruding portion for increasing a junction area of a joint portion between the rotating shaft member and the incident light adjusting section, in which the incident light adjusting section is rotated by the drive section via the rotating shaft member to be displaced to an inserted position located in the optical path of the incident light that passes through the openings or a retracted position to thereby adjust the incident light.

12 Claims, 11 Drawing Sheets

(56) References Cited

U.S. PATENT DOCUMENTS

2012/0002309 A1 1/2012 Okita
2012/0201682 A1 8/2012 Dymond et al.

FOREIGN PATENT DOCUMENTS

| JP | 2012-163100 A | 8/2012 |
|---|---|---|
| WO | WO 2012/107736 A1 | 8/2012 |

* cited by examiner

LIGHT ADJUSTING APPARATUS

CROSS REFERENCE TO RELATED APPLICATION

This application is a continuation application of PCT/JP2013/063634 filed on May 16, 2013 and claims benefit of Japanese Application No. 2012-217037 filed in Japan on Sep. 28, 2012, the entire contents of which are incorporated herein by this reference.

BACKGROUND OF THE INVENTION

1. Field of the Invention

The present invention relates to a light adjusting apparatus that adjusts light by inserting/retracting an incident light adjusting section into/from an optical path of incident light.

2. Description of the Related Art

Image pickup devices having an image pickup function are widely used in a variety of fields, among which there is a field of small image pickup devices having a relatively small shape. Some examples of such a small image pickup device include an electronic endoscope, an optical microscope provided with an image pickup function, a portable device provided with an image pickup function or a micro video scope.

Since priority is given to miniaturization in conventional small image pickup devices, a fixed focus lens, a fixed opening diaphragm, a fixed characteristic filter or the like are adopted as optical elements such as a lens, a diaphragm and an optical filter.

In contrast, high image quality had been also required for these small image pickup devices in recent years, and there has been a growing demand for adopting a focus lens, a variable diaphragm, a variable characteristic filter or the like as optical elements of the aforementioned light adjusting apparatus, that is, a demand for functions as a light adjusting apparatus that adjusts light.

Thus, many techniques are being proposed which seek to reduce sizes of light adjusting apparatuses so as to be applicable to small image pickup devices.

As an example, Japanese Patent Application Laid-Open Publication No. 10-20360 describes a configuration in which a coil body (5) is interposed between an upper cover (1) and a lower cover (7) and a rotor (4) polarized into two poles by a magnetic field generated by the coil body (5) is rotated. A diaphragm blade member (2) is attached to this rotor (4) so as to rotate integrally therewith via a shaft (3), and when the rotor (4) rotates, the diaphragm blade member (2) protrudes or retracts on the optical axis so as to adjust incident light. The configuration in which the diaphragm blade member (2) for adjusting light is attached to the rotor (4) which is a member from which a rotary drive force is first generated so as to rotate integrally therewith is considered particularly suitable for miniaturization of light adjusting apparatuses and miniaturization in a direction perpendicular to the optical axis.

There is a demand for further slimming down of the incident light adjusting section such as the aforementioned diaphragm blade when trying to implement a smaller, slimmer and lighter light adjusting apparatus. Since the configuration described in Japanese Patent Application Laid-Open Publication No. 10-20360 is one in which the shaft (3) is inserted into an orifice perforated in the diaphragm blade member (2) and joined, if the diaphragm blade member (2) is slimmed down, the junction area of the joint portion also becomes smaller.

This aspect will be described with reference to FIG. 17 and FIG. 18. FIG. 17 is a perspective view illustrating a configuration of an incident light adjusting section in a conventional light adjusting apparatus and FIG. 18 is a cross-sectional view illustrating the configuration of the incident light adjusting section in the conventional light adjusting apparatus. Note that FIG. 17 and FIG. 18 show adjustment by a diaphragm as an example of light adjustment.

An incident light adjusting section (106) is a frame member (106b) having an optical opening (106a) which serves as a diaphragm opening. This frame member (106b) has a holding portion (106c) protruding from part of its perimeter in a diameter direction and a columnar rotating shaft member (111) is joined to a circular orifice (106d) provided in this holding portion (106c) so as to rotate integrally therewith. Therefore, the joint portion becomes a part where a circumferential surface (111a) of the rotating shaft member (111) contacts the circular orifice (106d) of the holding portion (106c).

To be more specific, as shown in FIG. 18, when the diameter of the rotating shaft member (111) is R0 and the thickness of the incident light adjusting section (106) is D0, a junction area S0 of the incident light adjusting section (106) and the rotating shaft member (111) is as shown in following equation 1.

$$S0 = \pi \times R0 \times D0 \qquad \text{[Equation 1]}$$

Therefore, when the thickness D0 decreases, the area of the joint portion also decreases in proportion thereto.

SUMMARY OF THE INVENTION

A light adjusting apparatus according to an aspect of the present invention includes a first substrate that has a first light passage shaped portion for allowing incident light to pass therethrough, a second substrate that is disposed parallel to the first substrate at a predetermined distance therefrom and has a second light passage shaped portion for allowing incident light to pass therethrough, a rotating shaft member rotatably attached to the first substrate and the second substrate so as to be perpendicular to substrate surfaces of the first substrate and the second substrate, a drive section that rotates the rotating shaft member, an incident light adjusting section that has an engaging surface shaped so as to contact an outside surface of the rotating shaft member, is joined to the outside surface of the rotating shaft member so as to rotate integrally therewith on the engaging surface, is arranged so as to rotate within the predetermined distance along with rotation of the rotating shaft member, and is provided with a light adjusting function, and a reinforcing portion for increasing a junction area of a joint portion between the rotating shaft member and the incident light adjusting section, in which the incident light adjusting section is rotated by the drive section via the rotating shaft member to be displaced to a retracted position which is retracted from an optical path of the incident light passing through the first light passage shaped portion and the second light passage shaped portion and to an inserted position located in the optical path of the incident light to thereby adjust the incident light.

DETAILED DESCRIPTION OF THE PREFERRED EMBODIMENTS

Hereinafter, embodiments of the present invention will be described with reference to the accompanying drawings.

[Embodiment 1]

Figure 1:
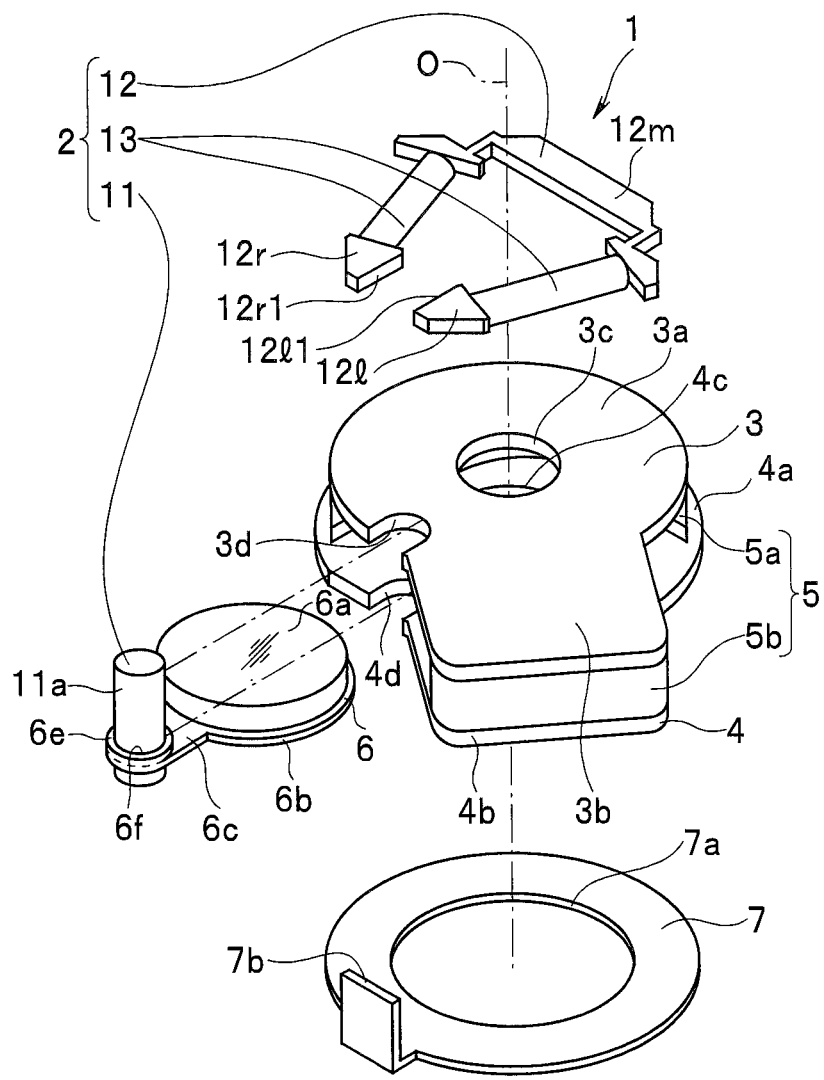
FIG. 1 is an exploded perspective view illustrating a configuration of a light adjusting apparatus according to Embodiment 1 of the present invention.
Figure 2:
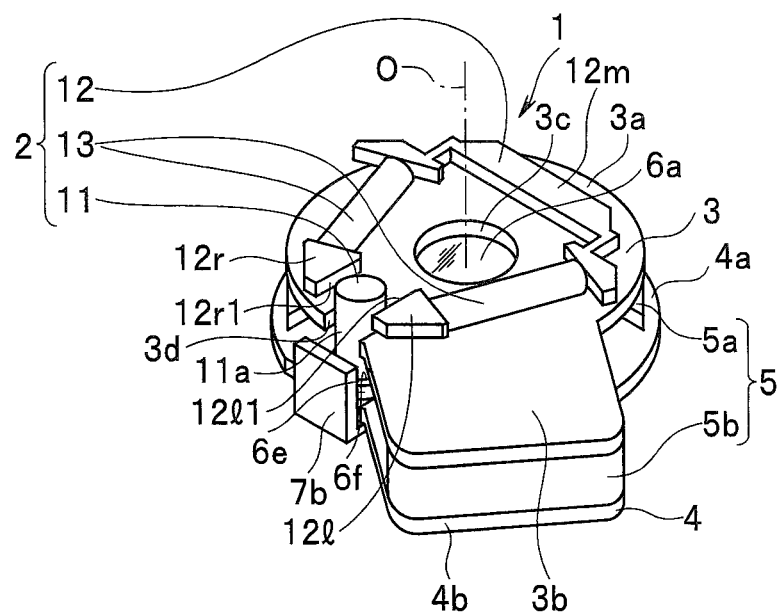
FIG. 2 is a perspective view illustrating the configuration of the light adjusting apparatus according to Embodiment 1 of the present invention.
Figure 3:
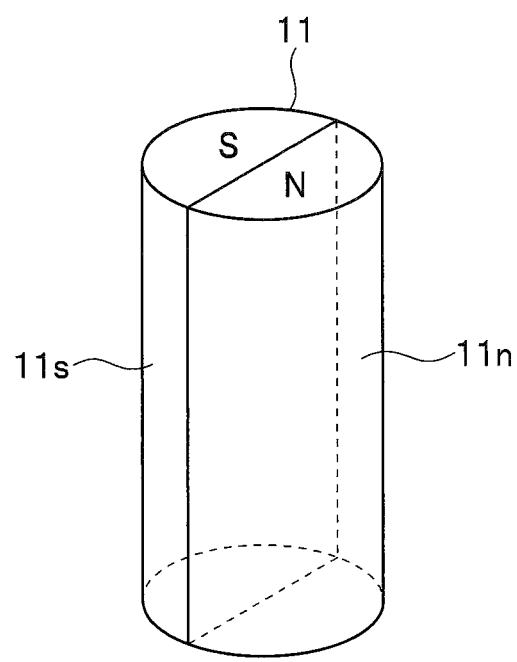
FIG. 3 is a perspective view illustrating a magnetic configuration of the rotating shaft member according to Embodiment 1 of the present invention.
Figure 4:
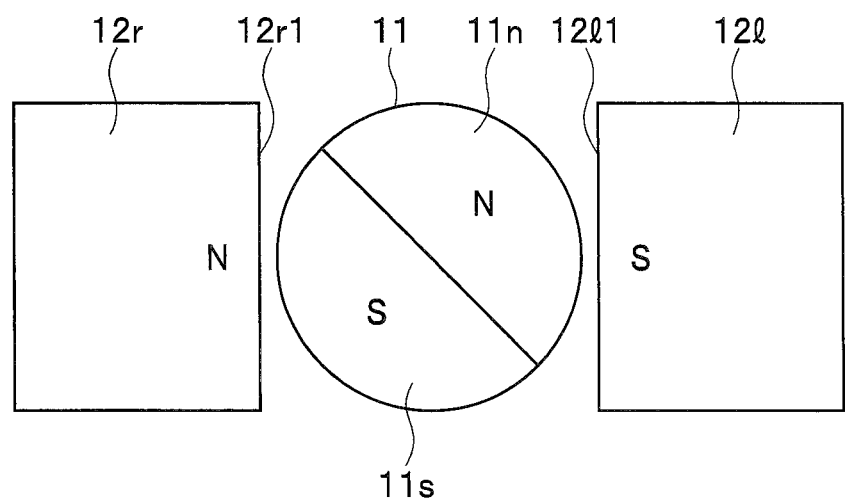
FIG. 4 is a diagram illustrating a situation of operation of the drive section according to Embodiment 1 of the present invention.
Figure 5:
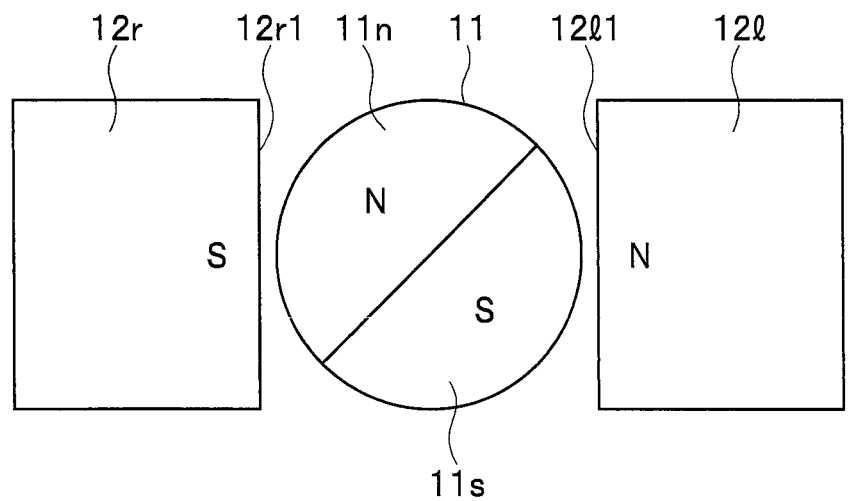
FIG. 5 is a diagram illustrating another situation of operation of the drive section according to Embodiment 1 of the present invention.

FIG. 1 to FIG. 7 illustrate Embodiment 1 of the present invention. First, an overview of a configuration of a light adjusting apparatus 1 will be described with reference to FIG. 1 to FIG. 5. Here, FIG. 1 is an exploded perspective view illustrating a configuration of the light adjusting apparatus 1, FIG. 2 is a perspective view illustrating the configuration of the light adjusting apparatus 1, FIG. 3 is a perspective view illustrating a magnetic configuration of a rotating shaft member 11, FIG. 4 is a diagram illustrating a situation of operation of a drive section 2 and FIG. 5 is a diagram illustrating another situation of operation of the drive section 2.

The light adjusting apparatus 1 is intended to adjust incident light, and examples of "adjustment" referred to herein include light quantity adjustment and pupil adjustment using a diaphragm, light quantity adjustment using an ND filter, condensing adjustment using lenses, polarization adjustment using a polarization filter, wavelength band adjustment using a color filter or a combination thereof, but the type of adjustment is not limited to these and any type of adjustment is applicable as long as it allows optical adjustment.

Hereinafter, a case will be described as an example where light adjustment is adjustment using lenses.

The light adjusting apparatus 1 is provided with a drive section 2, a first substrate 3, a second substrate 4, a spacer 5, an incident light adjusting section 6, and a dropout prevention member 7.

In the present embodiment, the drive section 2 includes a rotating shaft member 11 made of an axial magnet magnetized so as to have different magnetic poles around an axis, a coil core member 12 placed in proximity to a side face of the rotating shaft member 11 at an end of the core member and coils 13 wound around the coil core member 12, the drive section 2 being intended to rotate the rotating shaft member 11 by transmitting a magnetic force, generated by passing a current through the coils 13, to the rotating shaft member 11 via the coil core member 12.

The rotating shaft member 11 is a columnar axial magnet formed as a permanent magnet and arranged such that its axial direction is parallel to an optical axis O of a main optical system which is not shown. As shown in FIG. 3, this rotating shaft member 11 has, for example, a two-pole configuration, magnetized such that one semicircular column portion becomes an S pole 11s and the other semicircular column portion becomes an N pole 11n. The rotating shaft member 11 preferably has a columnar shape but not limited to a columnar shape, and may have, for example, a polygonal columnar shape.

The coil core member 12 is fanned of a magnetic body such as permalloy or silicon steel into an open curved shape (that is, a partially cut closed curved line) and is formed into a substantially triangular shape in the example shown in FIG. 1 including a rectilinear right arm portion 12r wound with a coil 13, a rectilinear left arm portion 12l wound with a coil 13 and a rectilinear coupling portion 12m that couples the right arm portion 12r and the left arm portion 12l. A distal end face 12r1 of the right arm portion 12r and a distal end face 12l1 of the left arm portion 12l constitute a pair of core end faces that sandwich both sides of an outside face 11a of the rotating shaft member 11 (both sides of a circumferential surface of the rotating shaft member 11 because the rotating shaft member 11 in the example shown in the drawing has a columnar shape). By this means, the coil core member, 12 and the rotating shaft member 11 construct a closed magnetic circuit to transmit magnetism generated by the coils 13. Note that an example where the closed curve has a substantially triangular shape has been shown above, but it goes without saying that the closed curve is not limited to the triangular shape.

The first substrate 3 and the second substrate 4 are each constructed of disk portions 3a and 4a integrated with square-shaped proximal end portions 3b and 4b.

The first substrate 3 includes an opening 3c which is a first light passage shaped portion to allow incident light to pass therethrough and a first cut-out portion 3d into which one end side of the rotating shaft member 11 in the axial direction is inserted, with the coils 13 and the coil core member 12 placed on one side thereof The second substrate 4 is disposed so as to face the other side of the first substrate 3, parallel to the first substrate 3 at a predetermined distance therefrom and includes an opening 4c which is a second light passage shaped portion to allow incident light to pass therethrough and a second cut-out portion 4d into which the other end side of the rotating shaft member 11 in the axial direction is inserted.

The first light passage shaped portion and the second light passage shaped portion constitute, for example, circular openings 3c and 4c formed at centers of the disk portions 3a and 4a, and an optical axis O of a main optical system which is not shown passes through the centers of the openings 3c and 4c perpendicular to the substrate surfaces of the first substrate 3 and the second substrate 4. Note that the opening 3c or the opening 4c may also be optical openings that function as opening diaphragms in the main optical system which is not shown.

It is sufficient if the first light passage shaped portion and the second light passage shaped portion have at least shapes that do not interrupt traveling of incident light in the optical axis O direction incident from the main optical system which is not shown, and therefore these parts need not always be circular openings, but may also be polygonal openings. Moreover, they need not even be openings but may also be U-shaped cut-out portions or square cut-out portions or the like.

The first cut-out portion 3d and the second cut-out portion 4d allow one end side and the other end side of the rotating shaft member 11 to be inserted in a direction crossing the optical axis O (direction perpendicular to the optical axis O as a specific example) and pivotably support the rotating shaft member 11 so as to be perpendicular to the substrate surfaces of the first substrate 3 and the second substrate 4. Such a configuration is intended to improve assemblability.

In the example shown in FIG. 1 and FIG. 2, the first cut-out portion 3d and the second cut-out portion 4d are formed as U-shaped cut-out portions and are provided in a vicinity of the proximal end portions 3b and 4b in the perimeters of the disk portions 3a and 4a such that their respective positions within a plane perpendicular to the optical axis O are aligned with each other. Therefore, the axial direction of the rotating shaft member 11 inserted in the first cut-out portion 3d and the second cut-out portion 4d becomes parallel to the optical axis O direction as described above.

The spacer 5 is intended to define a predetermined distance between the aforementioned first substrate 3 and second substrate 4. This spacer 5 is configured by including an arc-shaped distal end spacer 5a sandwiched between the disk portions 3a and 4a of the first substrate 3 and second substrate 4 along a distal end side circumferential direction, and a proximal end spacer 5b sandwiched between the proximal end portions 3b and 4b of the first substrate 3 and the second substrate 4.

The incident light adjusting section 6 is provided with a light adjusting function, to which the aforementioned rotating shaft member 11 is joined so as to rotate integrally therewith, the incident light adjusting section 6 being disposed so as to rotate along with the rotation of the rotating shaft member 11 within a predetermined distance defined by the spacer 5 between the first substrate 3 and the second substrate 4. In this example, the incident light adjusting section 6 is an optical element which is inserted in the optical path of the aforementioned main optical system which is not shown and has a function as a zoom lens for changing a focal length of the main optical system or a focus lens for changing the focus position or the like.

The dropout prevention member 7 is intended to prevent dropout of the incident light adjusting section 6. That is, the dropout prevention member 7 has a ring shape including a circular orifice 7a having a size that does not interrupt traveling of a luminous flux passing through the opening 3c and the opening 4c, and includes a dropout prevention wall 7b that protrudes from part of its circumference in the optical axis direction. The dropout prevention member 7 is fixed to an undersurface of the second substrate 4 (plane opposite to the side facing the first substrate 3), and the dropout prevention wall 7b and the second cut-out portion 4d together sandwich the rotating shaft member 11 to thereby prevent dropout of the rotating shaft member 11 inserted in the first cut-out portion 3d and the second cut-out portion 4d, and consequently prevent dropout of the incident light adjusting section 6.

With such a configuration, the light adjusting apparatus 1 rotates the incident light adjusting section 6 through the drive section 2 via the rotating shaft member 11 to displace the incident light adjusting section 6 to a retracted position which is retracted from an optical path of incident light that passes through the openings 3c and 4c, and to an inserted position located in the optical path of the incident light to thereby adjust the incident light.

That is, as shown in FIG. 4 and FIG. 5, when a current in one direction is passed through the coils 13, one of the distal end face 12r1 of the right arm portion 12r and the distal end face 12l1 of the left arm portion 12l is magnetized to an S-pole and the other is magnetized to an N-pole, whereas when a current in the other direction is passed through the coil 13, the poles magnetized are inverted. The rotating shaft member 11 rotates toward a minimum point of a magnetic field potential which is generated through magnetic interaction between a magnetic pole of itself and a magnetic field generated by the coil 13. When the rotating shaft member 11 has a two-pole configuration, the positions of the minimum points of the magnetic field potential formed are, for example, 180° opposite to each other between the aforementioned current in one direction and current in the other direction. However, the rotation range of the rotating shaft member 11 and the incident light adjusting section 6 is regulated by a stopper or the like which is not shown that defines the inserted position and the retracted position to within a range of a predetermined angle smaller than 180°. Therefore, the incident light adjusting section 6 moves to the inserted position when a current in one direction is applied to the coils 13 and moves to the retracted position when a current in the other direction is applied to the coils 13.

Note that although a case has been described for simplicity here where one pair of the incident light adjusting section 6 and the drive section 2 is provided, a plurality of pairs may also be provided. When two pairs are provided as an example, incident light can be adjusted in three stages: incident light adjustment when the first incident light adjusting section and the second incident light adjusting section are located at the retracted position, incident light adjustment when only the first incident light adjusting section is located at the inserted position and incident light adjustment when only the second incident light adjusting section is located at the inserted position. Moreover, in the case of a configuration in which both the first incident light adjusting section and the second incident light adjusting section are simultaneously located at the inserted position, the number of stages of incident light adjustment can be further incremented by one, that is, four-stage incident light adjustment is enabled. When a plurality of pairs of the incident light adjusting section 6 and the drive section 2 are provided in this way, there is an advantage that incident light adjustment in three or more stages is enabled.

Figure 6:
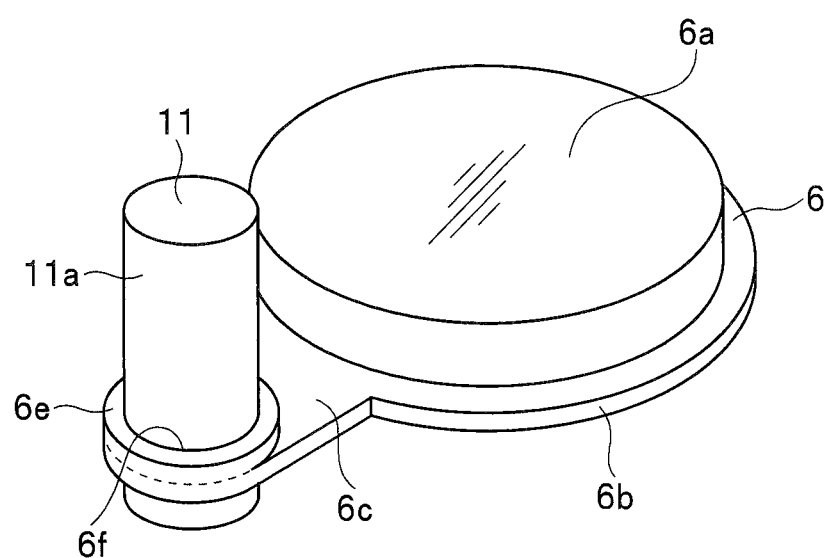
FIG. 6 is a perspective view illustrating configurations of an incident light adjusting section and a rotating shaft member according to Embodiment 1 of the present invention.
Figure 7:
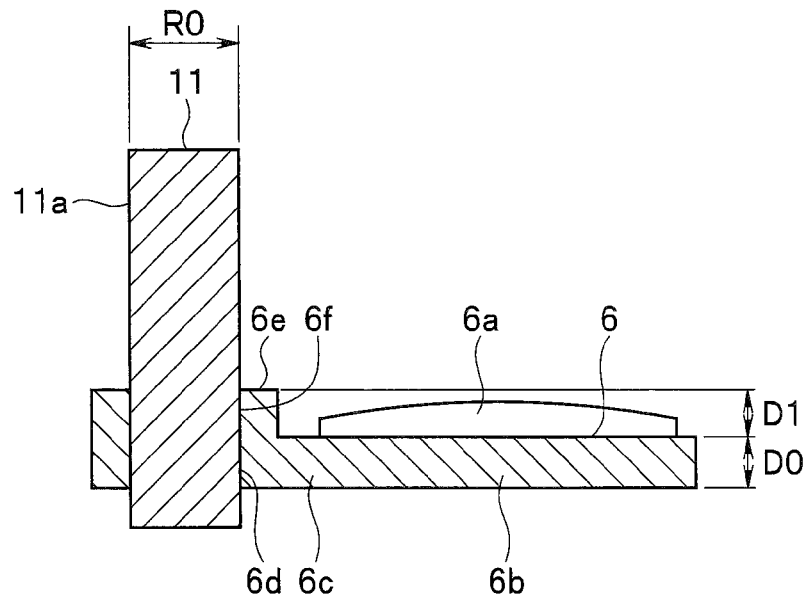
FIG. 7 is a cross-sectional view illustrating configurations of the incident light adjusting section and the rotating shaft member according to Embodiment 1 of the present invention.

Next, FIG. 6 is a perspective view illustrating configurations of the incident light adjusting section 6 and the rotating shaft member 11 and FIG. 7 is a cross-sectional view illustrating the configurations of the incident light adjusting section 6 and the rotating shaft member 11.

The incident light adjusting section 6 is provided with a lens 6a having optical power mounted on a ring-shaped lens frame 6b. The lens frame 6b includes a holding portion 6c that protrudes in the diameter direction from part of a rim thereof. An engaging surface 6d which forms a circular orifice shaped so as to contact the outside face 11a which forms a circumferential surface of the rotating shaft member 11 is formed in the holding portion 6c. The incident light adjusting section 6 is joined to the outside face 11a of the rotating shaft member 11 so as to rotate integrally therewith on this engaging surface 6d. Therefore, the portion where the outside face 11a of the rotating shaft member 11 contacts the engaging surface 6d of the holding portion 6c constitutes a joint portion.

Furthermore, a reinforcing portion is provided for increasing a junction area of the joint portion between the rotating shaft member 11 and the incident light adjusting section 6 extending in the optical axis O direction from the rim of the engaging surface 6d which forms the circular orifice of the holding portion 6c. This reinforcing portion constitutes a ring-shaped protruding portion 6e that protrudes in the axial direction (direction toward the first substrate 3) of the rotating shaft member 11 along the outside face 11a of the rotating shaft member 11 and is provided so as to be integral with the incident light adjusting section 6. The ring-shaped protruding portion 6e is provided with a second engaging surface 6f having a circular orifice shaped so as to contact the outside face 11a of the rotating shaft member 11. The incident light adjusting section 6, together with the aforementioned engaging surface 6d, is joined to the rotating shaft member 11 on this second engaging surface 6f so as to increase the junction area.

Here, the engaging surface 6d and the second engaging surface 6f are joined to the rotating shaft member 11 by means of, for example, press-fitting (engagement whereby vertical resistance that generates a frictional force is generated) or adhesion using an adhesive.

With such a configuration, as shown in FIG. 7, when the diameter of the rotating shaft member 11 is R0, the thickness of the incident light adjusting section 6 is D0 and the protrusion height of the ring-shaped protruding portion 6e in the optical axis O direction is D1, a junction area S1 of the joint portion between the incident light adjusting section 6 including the ring-shaped protruding portion 6e and the rotating shaft member 11 is as shown in following equation 2.

$$S1 = \pi \times R0 \times (D0 + D1) \quad \text{[Equation 2]}$$

Figure 17:
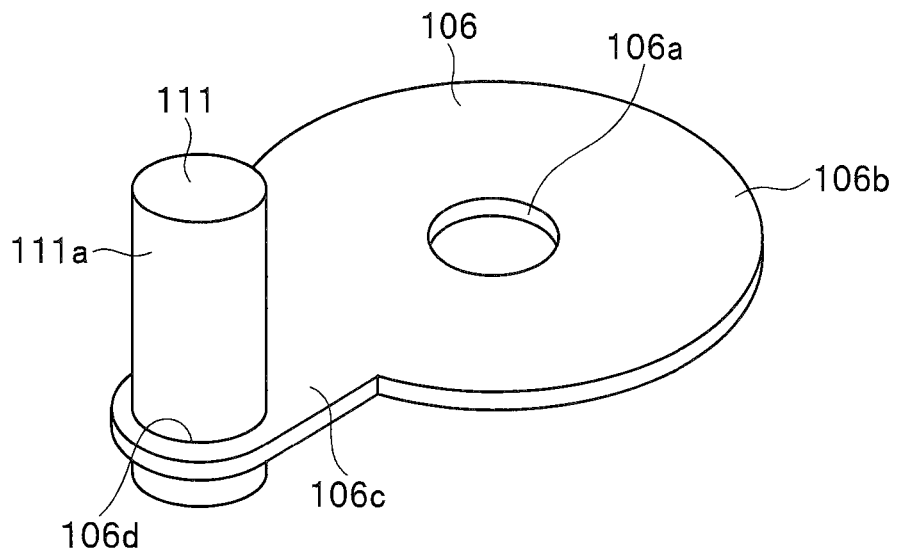
FIG. 17 is a perspective view illustrating a configuration of an incident light adjusting section in a conventional light adjusting apparatus.
Figure 18:
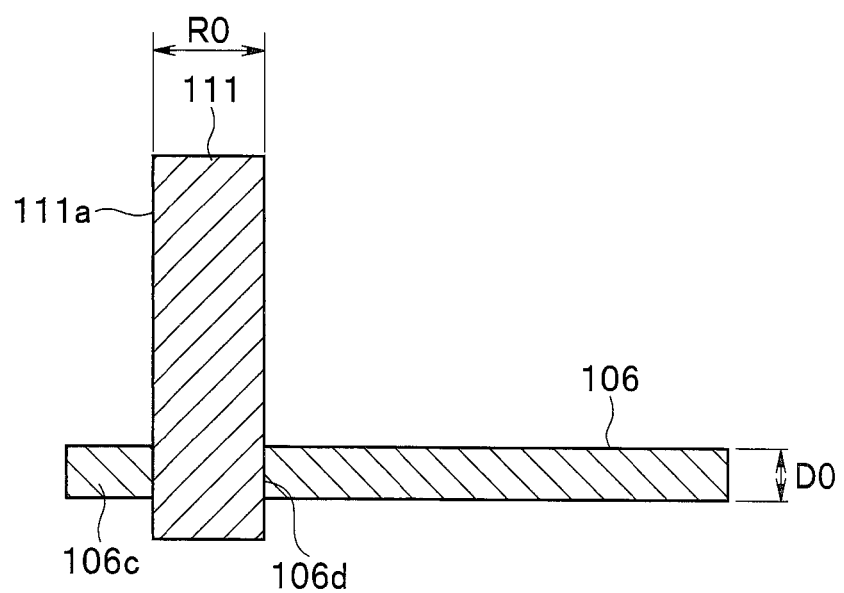
FIG. 18 is a cross-sectional view illustrating the configuration of the incident light adjusting section in the conventional light adjusting apparatus.

Therefore, provision of the ring-shaped protruding portion 6e means that the junction area has increased by $\pi \times R0 \times D1$ from the conventional junction area $S0 = \pi \times R0 \times D0$ shown in FIG. 17 and FIG. 18 (this increment is equivalent to the area of the second engaging surface 6f). By adjusting the protrusion height D1 of the ring-shaped protruding portion 6e to a desired value, it is possible to control the increment of the junction area to a desired value, providing an advantage that the degree of freedom of design is also high.

Embodiment 1 in such a configuration provides the reinforcing portion to increase the junction area of the joint portion between the rotating shaft member and the incident light adjusting section, and can thereby secure the strength of bonding with the rotating shaft member even when the thickness of the incident light adjusting section is reduced.

Moreover, since the reinforcing portion is provided only in a vicinity of the joint portion between the rotating shaft member and the incident light adjusting section, it is possible not only to suppress an increase in weight but also to suppress an increment in rotation moment without any substantial reduction of the rotation speed of the incident light adjusting section.

Furthermore, since the reinforcing portion is provided in the incident light adjusting section, it is possible to effectively increase the strength of the portion where a rotational torque is transmitted from the rotating shaft member.

[Embodiment 2]

Figure 8:
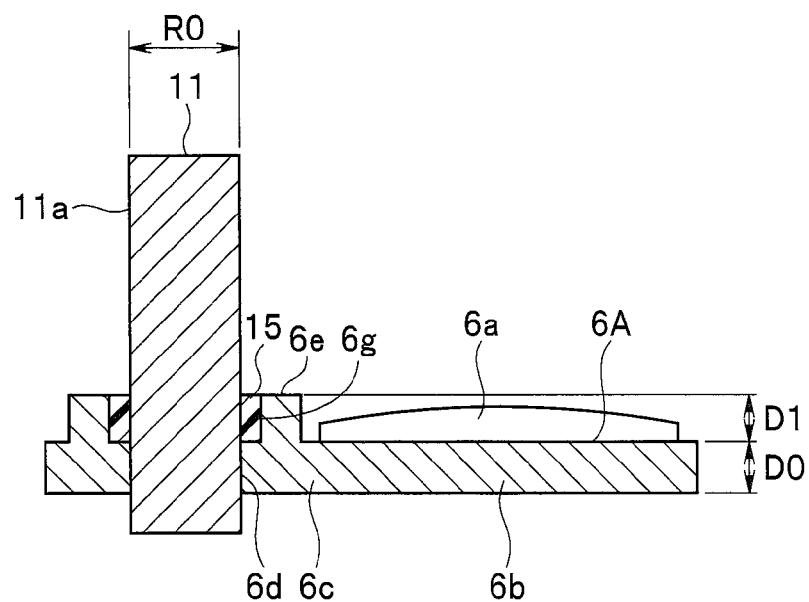
FIG. 8 is a cross-sectional view illustrating configurations of an incident light adjusting section and a rotating shaft member according to Embodiment 2 of the present invention.

FIG. 8 illustrates Embodiment 2 of the present invention and is a cross-sectional view illustrating configurations of an incident light adjusting section 6A and the rotating shaft member 11.

In this Embodiment 2, parts similar to those in aforementioned Embodiment 1 are assigned the same reference numerals or the like and description thereof will be omitted, and only differences will be mainly described.

As in the case of the aforementioned Embodiment 1, the reinforcing portion in the present embodiment is also made up of the ring-shaped protruding portion 6e, but the ring-shaped protruding portion 6e in the present embodiment is shaped such that a gap is formed between a second engaging surface 6g on an inner circumferential side and the outside face 11a of the rotating shaft member 11.

On the other hand, as in the case of aforementioned Embodiment 1, the engaging surface 6d of the holding portion 6c is shaped so as to contact the outside face 11a of the rotating shaft member 11.

The incident light adjusting section 6A is joined to the rotating shaft member 11 by filling the gap generated between the outside face 11a of the rotating shaft member 11 and the second engaging surface 6g with an adhesive 15 and thereby increasing the junction area.

In this Embodiment 2, the area of the joint portion between the incident light adjusting section 6A including the ring-shaped protruding portion 6e and the rotating shaft member 11 is $\pi \times R0 \times (D0 + D1)$ as in the case of aforementioned Embodiment 1.

According to such Embodiment 2, it is possible to achieve substantially the same effects as those of aforementioned Embodiment 1, and since the gap is provided between the outside face 11a of the rotating shaft member 11 and the second engaging surface 6g, the gap is filled with the adhesive 15 to a certain thickness, which can provide reliable bonding.

Moreover, since the engaging surface 6d is shaped so as to contact the outside face 11a of the rotating shaft member 11, it is possible to determine the axial position of the rotating shaft member 11 by the engaging surface 6d and prevent the adhesive 15 that fills the gap with the second engaging surface 6g of the rotating shaft member 11 from dripping downward by the engaging surface 6d contacting the outside face 11a (that is, a state as if there were no gap).

Furthermore, if the rotating shaft member 11 is configured so as to be press-fitted in the engaging surface 6d, the rotating shaft member 11 is joined in two ways: adhesion and press-fitting, making it possible to realize stronger junction.

[Embodiment 3]

Figure 9:
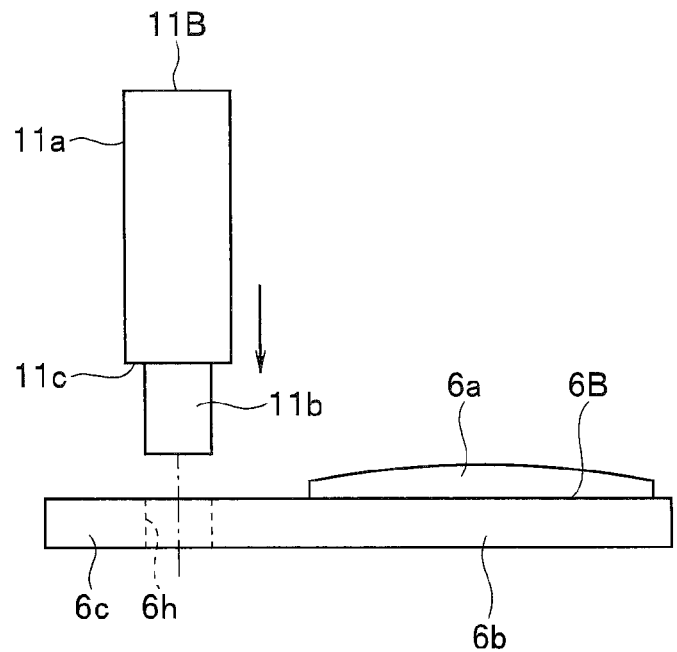
FIG. 9 is a side view illustrating configurations of an incident light adjusting section and a rotating shaft member according to Embodiment 3 of the present invention.
Figure 10:
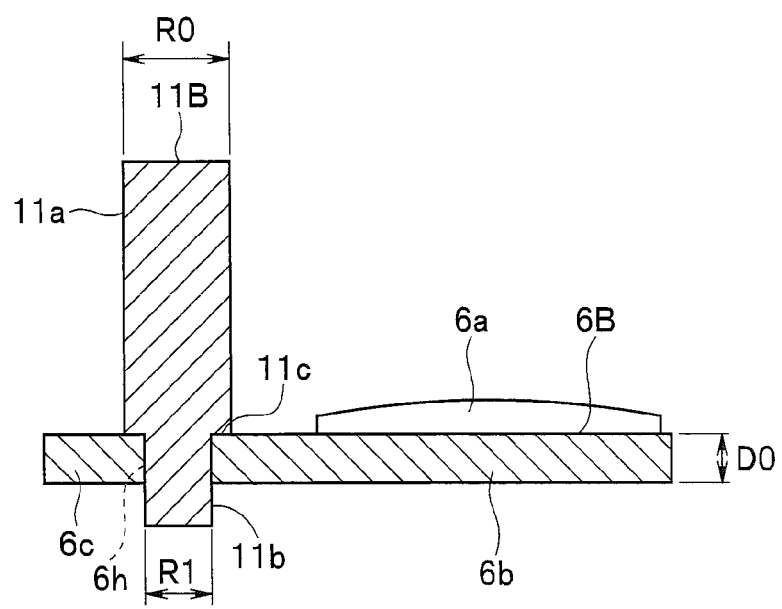
FIG. 10 is a cross-sectional view illustrating the configurations of the incident light adjusting section and the rotating shaft member according to Embodiment 3 of the present invention.

FIG. 9 and FIG. 10 illustrate Embodiment 3 of the present invention, FIG. 9 is a side view illustrating configurations of an incident light adjusting section 6B and a rotating shaft member 11B, and FIG. 10 is a cross-sectional view illustrating the configurations of the incident light adjusting section 6B and the rotating shaft member 11B.

In this Embodiment 3, parts similar to those in aforementioned Embodiments 1 and 2 are assigned the same reference numerals or the like and description thereof will be omitted as appropriate and only differences will be mainly described.

While the reinforcing portion is provided so as to be integral with the incident light adjusting sections 6 and 6A in aforementioned Embodiments 1 and 2, the reinforcing portion is provided so as to be integral with the rotating shaft member 11B in the present embodiment.

The rotating shaft member 11B includes a different diameter portion having a different cross-sectional area perpendicular to the optical axis O direction and this different diameter portion constitutes a small diameter portion 11b in the present embodiment.

A stepped surface 11c connecting the small diameter portion 11b and the outside face 11a other than the small diameter portion 11b in the rotating shaft member 11B and perpendicular to the axial direction constitutes a reinforcing portion, and this stepped surface 11c is bonded to a surface perpendicular to the optical axis O direction of the incident light adjusting section 6B (top surface shown in FIG. 9 and FIG. 10).

On the other hand, an engaging surface 6h of the holding portion 6c is shaped so as to contact the outside face of the small diameter portion 11b of the rotating shaft member 11B and is joined to the outside face of the small diameter portion 11b by means of adhesion or press-fitting.

The rotating shaft member 11B of the present embodiment is assembled by inserting the small diameter portion 11b into an orifice having the engaging surface 6h from above the incident light adjusting section 6B shown in FIG. 9 and FIG. 10.

In such a configuration, if the diameter of the small diameter portion 11b is R1, the junction area S1 of the joint portion between the rotating shaft member 11B including the stepped surface 11c and the incident light adjusting section 6B in the present embodiment is as shown in following equation 3.

$$S1 = \pi \times R1 \times D0 + \pi \times (R0^2 - R1^2)/4 \quad \text{[Equation 3]}$$

Now, a condition under which the junction area S1 of the present embodiment becomes greater than the conventional junction area S0 (see equation 1) shown in FIG. 17 and FIG. 18, that is, the range of R1 is calculated which satisfies an inequality shown in following equation 4.

$$S1 > S0 \quad \text{[Equation 4]}$$

When S0−S1 is calculated while adjusting a coefficient, $$4 \times (S0 - S1)/\pi = R1^2 - 4 \times D0 \times R1 + 4 \times D0 \times R0 - R0^2 \quad \text{[Equation 5]}$$
$$= (R1 - R0)(R1 + R0 - 4D0)$$

and therefore solution R1 which results in S0−S1=0 is $$R1 = R0, (4D0 - R0) \quad \text{[Equation 6]}$$

As shown in FIG. 9 and FIG. 10, since R1 is a diameter smaller than R0, in order for R1 that satisfies equation 4 within a range of R0>R1 to exist, it is necessary to satisfy $$D0 < (R0/2) \quad \text{[Equation 7]}$$

that is, the thickness D0 of the incident light adjusting section 6B needs to be smaller than a radius (R0/2) of the rotating shaft member 11B.

Since the present embodiment is intended to secure bonding strength with the rotating shaft member 11B even when the thickness D0 of the incident light adjusting section 6B is reduced, this equation 9 is considered to be satisfied for a target to which the configuration of the present embodiment is applied.

Therefore, including the constraints shown in this equation 7, if within a range of $$(4D0 - R0) < R1 < R0 \ \{\text{when } (R0/4) < D0 < (R0/2)\}$$

$$0 < R1 < R0 \ \{\text{when } D0 \leq (R0/4)\} \quad \text{[Equation 8]}$$

the diameter R1 of the small diameter portion 11b is determined, equation 4 is satisfied, that is, the junction area can be increased compared to the prior art.

According to such Embodiment 3, it is possible to achieve substantially the same effects as those of aforementioned Embodiments 1 and 2, and since the reinforcing portion is provided so as to be integral with the rotating shaft member 11B, providing an advantage that the incident light adjusting section 6B may be kept to a certain thickness without the need to change it and it is easy to mold the incident light adjusting section 6B.

Moreover, since the rotating shaft member 11B is asymmetric with respect to the axial direction, it is possible to easily recognize which side should be joined to the incident light adjusting section 6B.

[Embodiment 4]

Figure 11:
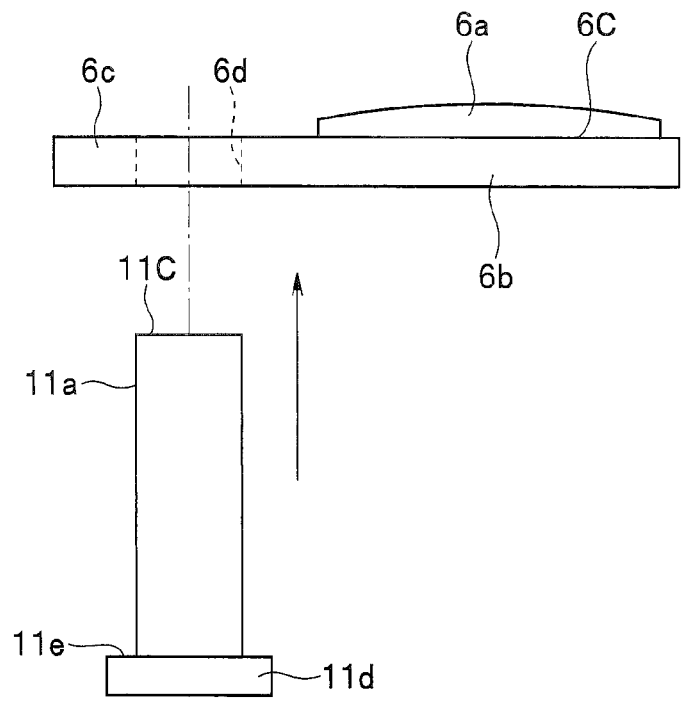
FIG. 11 is an exploded side view illustrating configurations of an incident light adjusting section and a rotating shaft member according to Embodiment 4 of the present invention.
Figure 12:
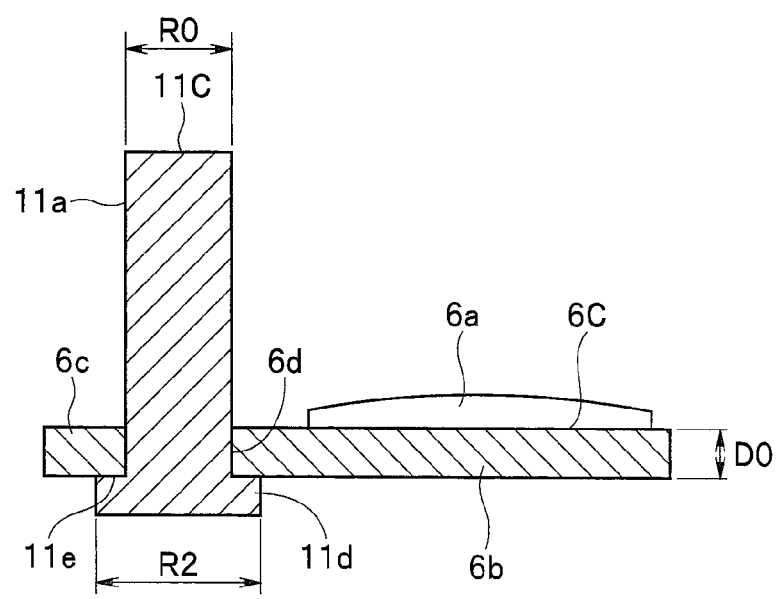
FIG. 12 is a cross-sectional view illustrating the configurations of the incident light adjusting section and the rotating shaft member according to Embodiment 4 of the present invention.

FIG. 11 and FIG. 12 illustrate Embodiment 4 of the present invention, FIG. 11 is an exploded side view illustrating configurations of an incident light adjusting section 6C and a rotating shaft member 11C and FIG. 12 is a cross-sectional view illustrating the configurations of the incident light adjusting section 6C and the rotating shaft member 11C.

In this Embodiment 4, parts similar to those in aforementioned Embodiments 1 to 3 are assigned the same reference numerals or the like and description thereof will be omitted as appropriate and only differences will be mainly described.

In the present embodiment, as in the case of aforementioned Embodiment 3, the reinforcing portion is provided so as to be integral with the rotating shaft member 11C, but the reinforcing portion is shaped so as to have a large diameter portion instead of the small diameter portion.

That is, the rotating shaft member 11C includes a different diameter portion having a different cross-sectional area perpendicular to the optical axis O direction and this different diameter portion is a flange-shaped large diameter portion 11d in the present embodiment.

A stepped surface 11e connecting the large diameter portion 11d and the outside face 11a other than the large diameter portion 11d in the rotating shaft member 11C and perpendicular to the axial direction constitutes a reinforcing portion, and this stepped surface 11e is bonded to a surface perpendicular to the optical axis O direction of the incident light adjusting section 6C (bottom surface shown in FIG. 11 and FIG. 12).

On the other hand, the engaging surface 6d of the holding portion 6c is shaped so as to contact the outside face 11a of the rotating shaft member 11C and is joined to the outside face of the large diameter portion 11d by means of adhesion or press-fitting as in the case of aforementioned Embodiments 1 and 2. Note that the second cut-out portion 4d of the second substrate 4 is configured so as to pivotably support the rotating shaft member 11C via this large diameter portion 11d.

The rotating shaft member 11C of the present embodiment is assembled by inserting the rotating shaft member 11C into an orifice having the engaging surface 6d from below the incident light adjusting section 6C shown in FIG. 11 and FIG. 12.

In such a configuration, if the diameter of the large diameter portion 11d is R2 as shown in FIG. 12, the junction area S1 of the joint portion between the rotating shaft member 11C including the stepped surface 11e and the incident light adjusting section 6C in the present embodiment is as shown in following equation 9.

$$S1 = \pi \times R0 \times D0 + \pi \times (R2^2 - R0^2)/4 \qquad \text{[Equation 9]}$$

Therefore, the junction area S1 of the present embodiment has increased by $\pi \times (R2^2 - R0^2)/4$ from the conventional junction area S0 (see equation 1) shown in FIG. 17 and FIG. 18 (this increment is equivalent to the area of the stepped surface 11e).

According to such Embodiment 4, it is possible to achieve substantially the same effects as those of aforementioned Embodiment 3, and there is an advantage that it is possible to control the increment of the junction area to a desired value by adjusting the diameter R2 of the large diameter portion 11d to a desired value.

[Embodiment 5]

Figure 13:
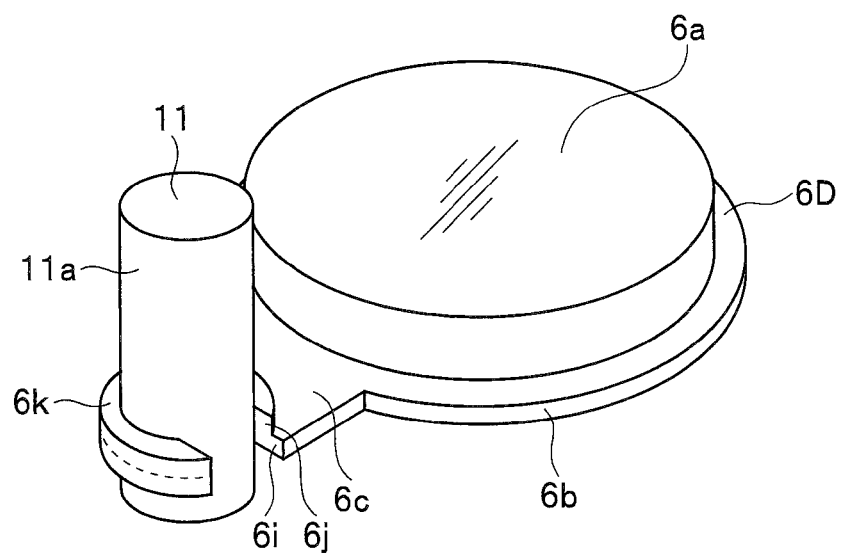
FIG. 13 is a perspective view illustrating configurations of an incident light adjusting section and a rotating shaft member according to Embodiment 5 of the present invention.
Figure 14:
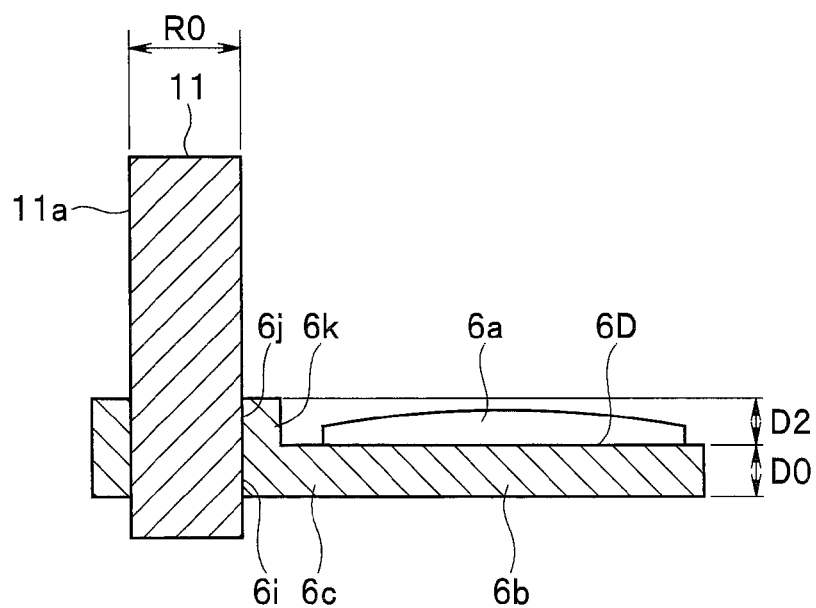
FIG. 14 is a cross-sectional view illustrating the configurations of the incident light adjusting section and the rotating shaft member according to Embodiment 5 of the present invention.
Figure 15:
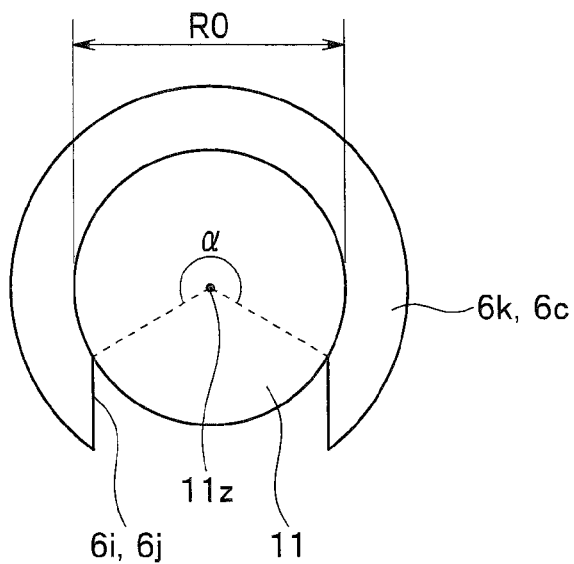
FIG. 15 is a plan view illustrating shapes of a C-shaped protruding portion of a holding portion of the incident light adjusting section and the rotating shaft member according to Embodiment 5 of the present invention when seen from an optical axis O direction.

FIG. 13 to FIG. 15 illustrate Embodiment 5 of the present invention, FIG. 13 is a perspective view illustrating configurations of an incident light adjusting section 6D and the rotating shaft member 11, FIG. 14 is a cross-sectional view illustrating the configurations of the incident light adjusting section 6D and the rotating shaft member 11, FIG. 15 is a plan view illustrating shapes of a C-shaped protruding portion 6k of the holding portion 6c of the incident light adjusting section 6D, and the rotating shaft member 11 when seen from the optical axis O direction.

In this Embodiment 5, parts similar to those in aforementioned Embodiments 1 to 4 are assigned the same reference numerals or the like and description thereof will be omitted as appropriate and only differences will be mainly described.

The present embodiment is configured by cutting parts in the circumferential direction of the holding portion 6c and the ring-shaped protruding portion 6e of aforementioned Embodiment 1 shown in FIG. 6 so as to be able to insert the rotating shaft member 11 from a direction crossing the optical axis O (direction perpendicular to the optical axis O as a specific example).

That is, the holding portion 6c is provided with an arc-shaped (C-shaped) engaging surface when seen from the optical axis O direction and shaped such that this engaging surface contacts the outside face 11a that makes up the circumferential surface of the rotating shaft member 11. A cut-out portion is formed in part of this engaging surface in the circumferential direction and the engaging surface combined with the cut-out portion forms a substantially U-shaped cut-out portion 6i which is substantially U-shaped when seen from the optical axis O direction.

As a reinforcing portion for increasing a junction area of the joint portion between the rotating shaft member 11 and the incident light adjusting section 6D, a C-shaped protruding portion 6k is provided in the optical axis O direction from an edge of the substantially U-shaped cut-out portion 6i of the holding portion 6c. This C-shaped protruding portion 6k is also provided with a substantially U-shaped cut-out portion 6j having the same shape as the aforementioned substantially U-shaped cut-out portion 6i when seen from the optical axis O direction. The inside of this substantially U-shaped cut-out portion 6j constitutes a C-shaped second engaging surface that contacts the outside face 11a that constitutes the circumferential surface of the rotating shaft member 11 as in the case of the aforementioned substantially U-shaped cut-out portion 6i.

In the configuration of the present embodiment, when the rotating shaft member 11 is joined to the incident light adjusting section 6D, the rotating shaft member 11 is inserted from a direction crossing the optical axis O direction (e.g., direction perpendicular to the optical axis O direction) into the substantially U-shaped cut-out portions 6i and 6j and joined using an adhesive or the like.

Note that FIG. 13 and FIG. 15 show a shape when α is set to be somewhat greater than π so as to prevent the rotating shaft member 11 from coming off the incident light adjusting section 6D. In the case of this shape, the rotating shaft member 11 is press-fitted into the substantially U-shaped cut-out portions 6i and 6j first and then joined using an adhesive or the like.

In such a configuration, as shown in FIG. 14, if the thickness of the C-shaped protruding portion 6k in the optical axis O direction is D2, and the angle of the C-shaped engaging surface inside the substantially U-shaped cut-out portions 6i and 6j as shown in FIG. 15 is a expressed based on the unit of radian around an axial center 11z of the rotating shaft member 11, the junction area S1 of the joint portion between the incident light adjusting section 6D including the C-shaped protruding portion 6k and the rotating shaft member 11 in the present embodiment is as shown in following equation 10.

$$S1 = \alpha \times (R0/2) \times (D0 + D2) \qquad \text{[Equation 10]}$$

Therefore, a condition for the junction area S1 in the present embodiment to increase from the conventional junction area S0 (see equation 1) shown in FIG. 17 and FIG. 18 (condition for aforementioned equation 4 to be satisfied) is as shown in following equation 11.

$$\alpha \times (R0/2) \times (D0 + D2) > \pi \times R0 \times D0 \qquad \text{[Equation 11]}$$

If the angle α is set to a greatest possible value under a condition that the rotating shaft member 11 can be inserted (can be press-fitted as required) from a direction perpendicular to the optical axis O with respect to the holding portion 6c and the reinforcing portion, the angle a is roughly determined according to the shape or material.

Therefore, if the conditional expression shown in equation 11 is read as a conditional expression to determine the thickness D2 of the C-shaped protruding portion 6k which is the reinforcing portion, the expression is as shown in following equation 12.

$$D2 > \{(2\pi/\alpha) - 1\} \times D0 \qquad \text{[Equation 12]}$$

Therefore, if the thickness D2 of the reinforcing portion is determined so as to satisfy equation 12, it is possible to guarantee that the junction area is increased from the conventional one. As a specific example, if α≈π, D2 may be set to D2>D0.

A case has been described above as an example where a cut-out portion is provided on the basis of the configuration of Embodiment 1, but a cut-out portion may also be provided on the basis of the configurations in Embodiments 2 and 4. In the case of the configuration in Embodiment 3, even if a cut-out portion is provided, it would be somewhat difficult to increase the junction area from the conventional one without increasing the diameter of the outside face 11a of the rotating shaft member 11. However, if possible, this may be applied as required.

According to such Embodiment 5, it is possible to provide substantially the same effects as those in aforementioned Embodiments 1 to 4 and attach the rotating shaft member 11 to the incident light adjusting section 6D from a direction crossing the optical axis, providing an advantage that assemblability improves.

[Embodiment 6]

Figure 16:
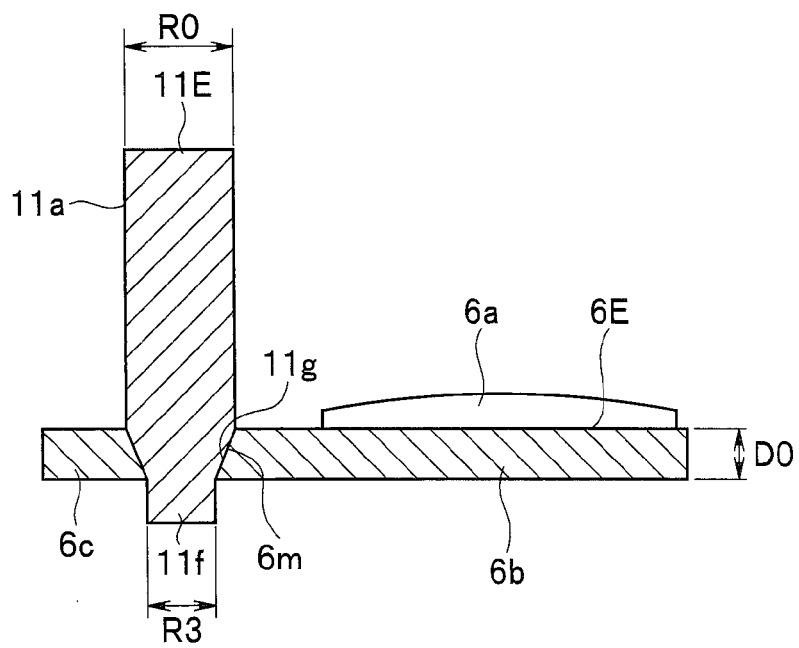
FIG. 16 is a cross-sectional view illustrating configurations of an incident light adjusting section and a rotating shaft member according to Embodiment 6 of the present invention.

FIG. 16 illustrates Embodiment 6 of the present invention and FIG. 16 is a cross-sectional view illustrating configurations of an incident light adjusting section 6E and a rotating shaft member 11E.

In this Embodiment 6, parts similar to those in aforementioned Embodiments 1 to 5 are assigned the same reference numerals or the like and description thereof will be omitted as appropriate and only differences will be mainly described.

The configuration of the present embodiment is similar to the configuration of aforementioned Embodiment 3 shown in FIG. 9 and FIG. 10, but the stepped surface is replaced by a tapered surface.

The rotating shaft member 11E includes a different diameter portion having a different cross-sectional area perpendicular to the optical axis O direction and this different diameter portion constitutes a small diameter portion 11f in the present embodiment.

The small diameter portion 11f of the rotating shaft member 11E is connected to the outside face 11a which is the rest of the rotating shaft member 11E via a tapered surface 11g which is inclined in the axial direction.

On the other hand, a tapered receiving orifice 6m which is an engaging surface shaped so as to contact the tapered surface 11g of the rotating shaft member 11E is formed in the holding portion 6c of the incident light adjusting section 6E, and the tapered surface 11g and the tapered receiving orifice 6m are bonded together by means of adhesion to form a reinforcing portion.

Therefore, the rotating shaft member 11E of the present embodiment is assembled by inserting the small diameter portion 11f side from above the incident light adjusting section 6E shown in FIG. 16 into the tapered receiving orifice 6m, causing the tapered surface 11g to contact the tapered receiving orifice 6m and joining the two using an adhesive or the like.

With such a configuration, if the diameter of the small diameter portion 11f is R3, the junction area S1 of the joint portion between the rotating shaft member 11E and the incident light adjusting section 6E via the tapered surface 11g and the tapered receiving orifice 6m in the present embodiment is as shown in following equation 13.

$$S1 = \pi \times (R0+R3)/2 \times \sqrt{\{(R0-R3)^2/4 + D0^2\}}$$ [Equation 13]

where symbol "$\sqrt{}$" shows that the square root of the value in parentheses is taken.

Since determining a range of R3 corresponding to the junction area S1 that satisfies an inequality "S1>S0" which is aforementioned equation 4 would involve complicated calculations, such a determination is omitted here, and by showing examples where equation 4 is not satisfied and examples where equation 4 is satisfied, it will be proven that the junction area may be possibly increased from that in the prior art depending on conditions.

First, specific examples of numerical values of D0, R0 and R3 in an arbitrary unit AU (Arbitrary Unit) are shown [where, "AU" may be one of "μ" and "mm" and the like (this shall not preclude being a unit in a greater scale, but since a light adjusting apparatus applicable to a small image pickup device is assumed, "μ" and "mm" are taken as an example)].

First, in the case where D0=2, R0=4 and R3=2, S0=8π, S1=3√5π≈6.7π, and the inequality of equation 4 is not satisfied.

On the other hand, in the case where D0=1, R0=4 and R3=2, S0=4π, S1=3√2π≈4.2π, and the inequality of equation 4 is satisfied.

To put it in more general terms, when taking into consideration a case where the thickness D0 of the incident light adjusting section 6E is thin and a taper which is large to a certain degree is provided (the difference between R0 and R3 is large), that is, D0<<(R0–R3), equation 13 can be approximated as shown in following equation 14.

$$S1\pi \times (R0+R3)(R0-R3)/4$$ [Equation 14]

When this equation 14 is compared with equation 1 factor by factor, it is obvious that (R0+R3)>R0 holds, and when aforementioned D0<<(R0–R3), D0<(R0–R3)/4 may also hold. Therefore, in the case of a condition under which the approximation of equation 14 holds, the inequality of equation 4 is considered to be substantially satisfied.

It is seen from above that in many cases, the target to which the configuration of the present embodiment is applied can be configured so as to satisfy equation 4.

Note that although an example has been described where a small diameter portion of aforementioned Embodiment 3 as shown in FIG. 9 and FIG. 10 is formed, a large diameter portion as shown in FIG. 11 and FIG. 12 of Embodiment 4 may be formed instead of the small diameter portion and a tapered surface may be formed with respect to this large diameter portion.

According to such Embodiment 6, substantially the same effects as those in aforementioned Embodiment 3 (aforementioned Embodiment 4 when a large diameter portion is formed) can be achieved.

Note that a case has been described in the aforementioned embodiments in which, as the drive section 2, the rotating shaft member 11 is an axial magnet and the rotating shaft member 11 or the like is magnetically rotated by the coil core member 12 wound with the coil 13, but the configuration of the drive section 2 applicable to a case where the reinforcing portion is provided in the joint portion between the incident light adjusting section 6 or the like and the rotating shaft member 11 or the like is not limited to the above example, and a configuration using a piezoelectric element or other drive sources may also be used. Therefore, the rotating shaft member 11 or the like may or may not constitute part of the drive section 2.

Note that the present invention is not limited to the aforementioned embodiments as they are, but the present invention can be implemented by modifying components thereof without departing from the spirit and scope of the invention in the implementation phase. Furthermore, a variety of aspects of the invention can be formed by appropriately combining the plurality of components disclosed in the above embodiments. For example, several components may be removed from all the components disclosed in the embodiments. Furthermore, components among different embodiments may be combined as appropriate. Thus, it goes without saying that a variety of modifications or applications can be made without departing from the spirit and scope of the invention.

What is claimed is:

1. A light adjusting apparatus comprising:
   a first substrate that has a first light passage shaped portion for allowing incident light to pass therethrough;
   a second substrate that is disposed parallel to the first substrate at a predetermined distance therefrom and has a second light passage shaped portion for allowing incident light to pass therethrough;

a rotating shaft member rotatably attached to the first substrate and the second substrate so as to be perpendicular to substrate surfaces of the first substrate and the second substrate;

a drive section that rotates the rotating shaft member;

an incident light adjusting section that has an engaging surface shaped so as to contact an outside surface of the rotating shaft member, is joined to the outside surface of the rotating shaft member so as to rotate integrally therewith on the engaging surface, is arranged so as to rotate within the predetermined distance along with rotation of the rotating shaft member, and is provided with a light adjusting function; and a reinforcing portion for increasing a junction area of a joint portion between the rotating shaft member and the incident light adjusting section, wherein the incident light adjusting section is rotated by the drive section via the rotating shaft member to be displaced to a retracted position which is retracted from an optical path of the incident light passing through the first light passage shaped portion and the second light passage shaped portion and to an inserted position located in the optical path of the incident light to thereby adjust the incident light.

2. The light adjusting apparatus according to claim 1, wherein the reinforcing portion is provided only in a vicinity of the joint portion between the rotating shaft member and the incident light adjusting section.

3. The light adjusting apparatus according to claim 2, wherein the reinforcing portion is provided so as to be integral with the incident light adjusting section, and the incident light adjusting section together with the engaging surface is further joined to the rotating shaft member in the reinforcing portion.

4. The light adjusting apparatus according to claim 2, wherein the reinforcing portion is provided so as to be integral with the rotating shaft member, and the rotating shaft member together with the outside surface is further joined to the incident light adjusting section in the reinforcing portion.

5. The light adjusting apparatus according to claim 3, wherein the reinforcing portion is a ring-shaped protruding portion that protrudes in an axial direction of the rotating shaft member along the outside surface of the rotating shaft member.

6. The light adjusting apparatus according to claim 5, wherein the ring-shaped protruding portion comprises a second engaging surface shaped so as to contact the outside surface of the rotating shaft member, and the incident light adjusting section together with the engaging surface is joined to the second engaging surface to thereby increase the junction area and joined to the rotating shaft member.

7. The light adjusting apparatus according to claim 5, wherein the ring-shaped protruding portion comprises a second engaging surface shaped so as to include a gap with the outside surface of the rotating shaft member, and the incident light adjusting section is joined to the rotating shaft member by filling the gap with an adhesive to thereby increase the junction area.

8. The light adjusting apparatus according to claim 6, wherein the engaging surface and the second engaging surface of the incident light adjusting section comprise a cut-out portion formed in part in the circumferential direction, into which the rotating shaft member can be inserted in a direction crossing the axial direction.

9. The light adjusting apparatus according to claim 7, wherein the engaging surface and the second engaging surface of the incident light adjusting section comprise a cut-out portion formed in part in the circumferential direction, into which the rotating shaft member can be inserted in a direction crossing the axial direction.

10. The light adjusting apparatus according to claim 4, wherein the rotating shaft member comprises a different diameter portion having a different cross-sectional area perpendicular to an axial direction of the rotating shaft member, the reinforcing portion is a stepped surface connecting the different diameter portion and the rest of the rotating shaft member and perpendicular to the axial direction, and the stepped surface of the rotating shaft member is bonded to a surface perpendicular to the axial direction of the incident light adjusting section.

11. The light adjusting apparatus according to claim 4, wherein the rotating shaft member comprises a different diameter portion having a different cross-sectional area perpendicular to the axial direction of the rotating shaft member, the reinforcing portion is a tapered surface connecting the different diameter portion and the rest of the rotating shaft member and inclined with respect to the axial direction, the engaging surface of the incident light adjusting section is shaped so as to contact the tapered surface, and the tapered surface of the rotating shaft member is bonded to the engaging surface of the incident light adjusting section.

12. The light adjusting apparatus according to claim 1, wherein the rotating shaft member is an axial magnet magnetized so as to have different magnetic poles around the axis and is included in the drive section, and the drive section further comprises a coil core member located in proximity to a side surface of the axial magnet at an end of the core member and a coil wound around the coil core member, and rotates the axial magnet by transmitting a magnetic force generated by passing a current through the coil to the axial magnet via the coil core member.

* * * * *